United States Patent [19]
Casey

[11] 3,727,900

[45] Apr. 17, 1973

[54] ADJUSTABLE NON-LINEAR SPRING AND SPRING SUSPENSION SYSTEM

[75] Inventor: Gerald F. Casey, Los Angeles, Calif.

[73] Assignee: Fema Corporation, Pacioma, Calif.

[22] Filed: Mar. 9, 1971

[21] Appl. No.: 122,425

[52] U.S. Cl............................................267/160
[51] Int. Cl. ...........................................F16f 1/26
[58] Field of Search....................267/159, 160, 158, 267/182

[56] References Cited

UNITED STATES PATENTS 1,939,286  12/1933  Spencer..............................267/159

FOREIGN PATENTS OR APPLICATIONS 1,168,704  4/1964  Germany............................267/159

Primary Examiner—James B. Marbert
Attorney—Harry Kotlar and Lewis B. Sternfels

[57] ABSTRACT

The spring, which is useful for obtaining linear motion in electro-mechanical devices, includes at least one leaf spring whose effective length is changed during movement in response to an applied force to vary its spring characteristics. The leaf spring includes a moveable portion to which is secured both a spacer shim and a washer placed over the shim. The radius of the washer is greater than the shim radius so that the washer edge overlays the shim. The arm length of the leaf from a fixed end of the leaf to the moveable portion provides a first force versus stroke characteristic of the spring, as may be represented by a curve, as may be configured substantially as a straight line having a first slope. As the spring moves further under the force, the edge of the washer contacts the leaf in accordance with the radius of the washer and the thickness of the shim so as to shorten the arm length of the spring and to provide a different force versus stroke characteristic, as may be further represented by another substantially straight line curve having a second slope different from the first. The combination of the linear curves produces a spring having a non-linear force versus displacement characteristic. Thus, by varying the thickness of the shim and/or the radius of the washer, and by adding as many additional shims of increasing radii between the washer and the first shim or by attaching similar springs to the original spring, the particular force versus stroke characteristics of the spring may be varied as desired to adjust the non-linear characteristics of the spring ensemble.

21 Claims, 15 Drawing Figures

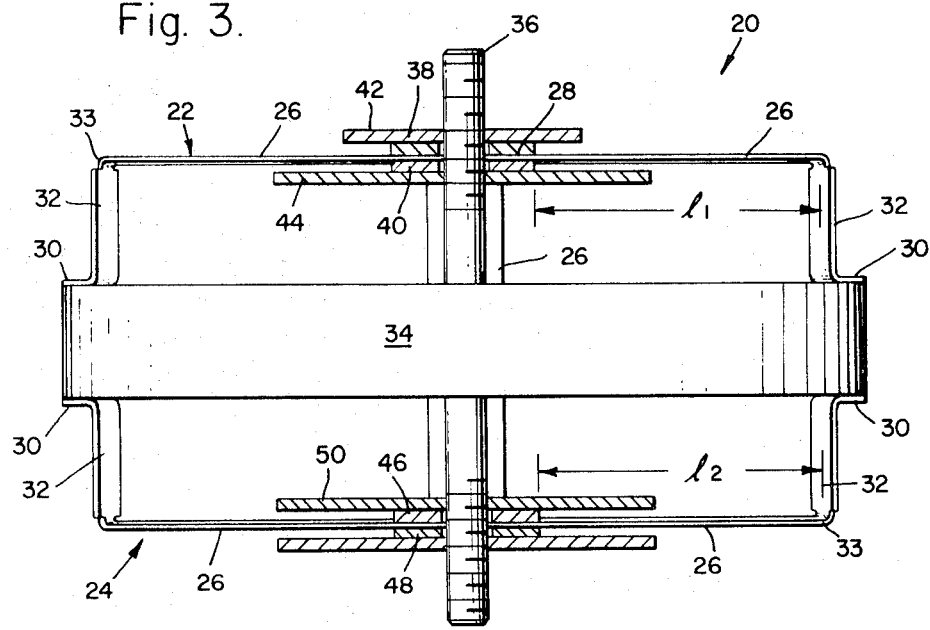
Fig. 3.
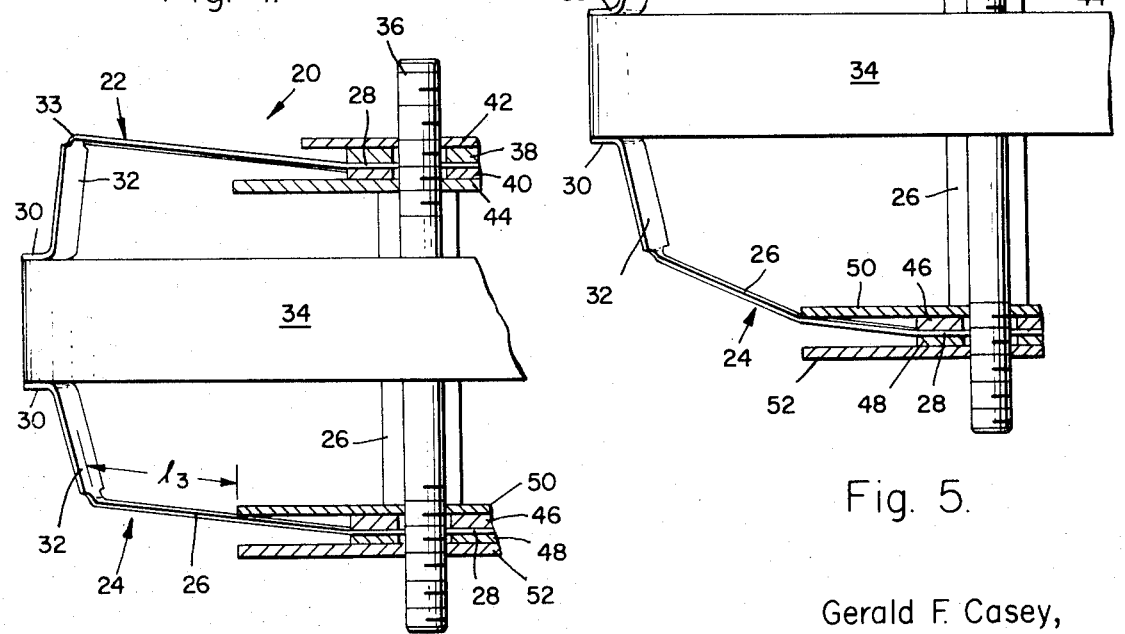
Fig. 4.
Fig. 5.
Gerald F. Casey,
INVENTOR.

ADJUSTABLE NON-LINEAR SPRING AND SPRING SUSPENSION SYSTEM

The present invention relates to a spring having non-linear force versus stroke characteristics and, in particular, to such a spring whose characteristics are adjustable. It is useful, for example, as a frictionless suspension system.

Non-linear springs are well known, examples thereof including belleville washers, conical springs, wave-washer springs, and cantilever springs, whose non-linear force versus stroke or displacement characteristics have been utilized to great advantage in many varying applications. However, such prior art springs also have several disadvantages. Belleville washers slide upon movement to produce friction, which results in frictional errors when the washers are stressed, and, like other non-linear springs, provide a single, non-adjustable force-stroke characteristic. While these deficiencies may not be objectionable in some instances, it is necessary to select a particular spring of specific dimensions to match a desired force-stroke characteristic and to replace the spring when another force-stroke characteristic is required. Further, each of the above-mentioned springs require special manufacturing processes and, therefore, are somewhat costly to fabricate. Thus, the need to replace a particular non-linear spring may become objectionable.

For example, the device described in copending patent application, Ser. No. 885,098, filed Dec. 15, 1969, now U.S. Pat. No. 3,604,959, patented Sept. 14, 1971 entitled, "Linear Motion Electro-Mechanical Device Utilizing Non-Linear Elements," assigned to the assignee of the present invention, utilizes a spring whose non-linear force-stroke characteristics are incapable of change or adjustment. These non-linear characteristics of the spring are matched with the particular non-linear magnetic force-armature position characteristics so as to provide linear motion of the armature. If it is desired to obtain a different matching between the spring characteristics and the permanent magnet-armature characteristics, the device must be partially disassembled and the springs must be replaced with another non-linear spring having the proper characteristics. Such replacement may not be easily accomplished, especially when the electromechanical device is no longer at its manufacturing plant, such as in the field. Furthermore, it is difficult to match a particular spring with a particular electromechanical device because of manufacturing inaccuracies of materials and "built-in" characteristics of any one element, for example, the magnetic properties of a magnet.

The present invention overcomes these and other problems by providing a simple leaf spring arrangement of inexpensive manufacture, such as by stamping, whose non-linear characteristics are easily adjusted by adjusting the effective arm length of the spring leaf. Adjustment of the arm length is effected simply by shortening the spring leaf one or more times during displacement of one part of the spring. Briefly, the present invention may be described as comprising a leaf spring having one fixed portion and another moveable portion to provide a flexible spring lever of specified length. By rigidizing a portion of the lever, the effective length thereof is shortened. Further shortening is effected by rigidizing further portions of the lever and is produced successively during movement of the lever. If this movement under influence of a force is graphically illustrated, the plot of stroke versus displacement for each displacement of the leaf prior to the succeeding shortening thereof will form a straight line of constant slope. At the point of shortening, the force-stroke plot is represented as another straight line but of different slope. Continuous shortening of the arm length will produce a force-stroke characteristic which can be made to approximate a smooth non-linear curve. Because of manufacturing variations in tolerances, the sharp theoretical breaks between straight lines become smoothed.

Shortening of the spring may be accomplished by securing a washer of specified radius to the spring at its moveable portion and by spacing the washer from the spring by a shim of specified thickness, the shim having a radius less than that of the washer. The lever arm extends from the fixed portion of the leaf spring to the point on the moveable portion having the washer and shim attached thereto. Shortening of the lever arm occurs when the moveable portion is displaced an amount sufficient to cause the edge of the washer to contact the spring. This contact between the washer edge and the leaf spring is determined both by the radius of the washer and the thickness of the shim.

By providing a stack of washers above the spring of increasing radii, a plurality of contacts with the edges of succeeding washers will occur in accordance with the thickness of the preceding washer so as to provide a series of shortenings of the arm lengths. The stack of washers and the shim may be replaced by a single washer having a curved bowl-shaped surface in contact with the moveable portion of the leaf spring so as to provide a smooth gradual shortening of the arm length and, consequently, a gradual uninterrupted slope to the force-stroke curve.

Alternatively, or in addition to the shim and washer combination, the spring may be bent upon itself to show a U-shaped configuration having two leaves with its fixed end spaced from but affixed to a large support underlying the U-bend of the spring and with its free end moveable. Upon displacement of the moveable end towards the support, the elbow or band of the U-shaped spring contacts the support to effectively shorten the arm length of the spring to a single leaf.

It is, therefore, an object of the present invention to provide a non-linear spring.

Another object is the provision of such a spring whose non-linear characteristics are adjustable.

Another object is to provide such a spring for suspension purposes.

Another object is the provision of such a spring having substantially frictionless characteristics.

Another object is to provide such a spring for suspension of rectilinear motion devices.

Another object is the provision of a linear motion electromechanical device utilizing such a spring.

Other aims and objects as well as a more complete understanding of the present invention will appear from the following explanation of exemplary embodiments and the accompanying drawings thereof, in which:

FIG. 3 is a side elevational view, partly in section, depicting the embodiment of FIG. 1 without displacement;

FIG. 4 is a side elevational view, in part section and partially cut away of the embodiment of FIG. 1 under slight displacement in response to a force;

FIG. 5 is a view similar to that of FIG. 4 depicting further displacement of the embodiment;

Figure 1:
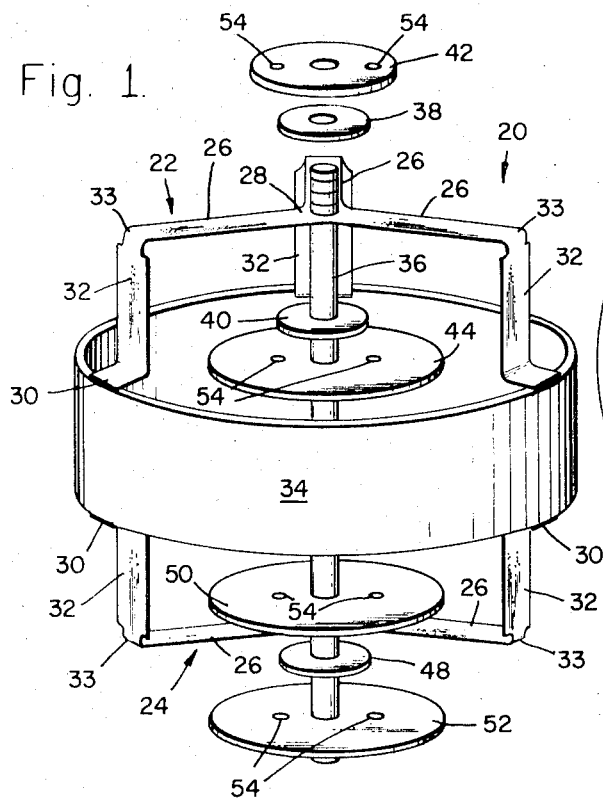
FIG. 1 is a perspective view, slightly exploded, of a first embodiment of the present invention.
Figure 2:
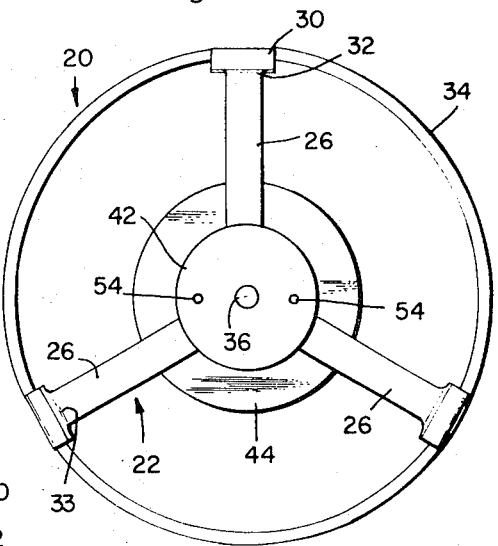
FIG. 2 is a top view of the embodiment depicted in FIG. 1.

Accordingly, with reference to FIGS. 1–5, and in particular to FIGS. 1 and 2, a spring suspension system 20 comprises a pair of leaf spring devices 22 and 24. Each leaf spring device includes a plurality of leaves 26 of spring material integrated at one of their ends to form a moveable center portion or hub 28. At their other ends, each leaf spring 26 terminates at a fixed end portion or foot 30 with a vertical connecting portion 32 extending from each foot and bending toward hub 28 at an elbow 33. Although three leaves or leaf springs 26 are depicted, it is to be understood that any number and/or any width of leaf may be used, including a spring diaphragm. Further, any number of leaf spring devices, from a single device to as many as may be desired, may be employed, depending upon the user's needs; however, for purposes of example, two devices and three leaf springs are described and illustrated.

Feet 30 are rigidly secured to one another by a supporting ring 34 or the like. A rod 36 extends through both hubs 28 of leaf spring devices 22 and 24 so that they will move in unison. A pair of shims 38 and 40 are centered on rod 36 and positioned about hub 28 of device 22 and a pair of clamp washers 42 and 44 are threadedly engaged with the rod and screwed tightly together in order to fixedly join shims 38 and 40 and hub 28 in sandwich fashion to one end of rod 36. Likewise, a pair of shims 46 and 48 (see also FIGS. 3–5) are placed about the hub of leaf spring device 24, with another end of rod 36 extending therethrough. Shims 46 and 48 (see FIGS. 3–5, in particular) are clamped about the hub by a pair of clamp washers 50 and 52 threadedly engaging the rod. Holes 54 are provided in the several clamp washers to enable tightening of the washers on rod 36.

Figure 6:
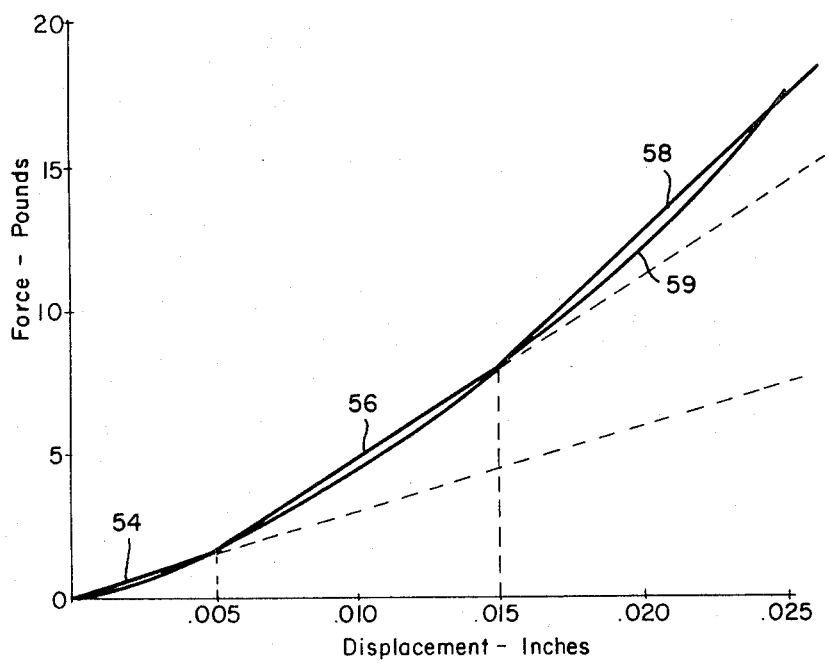
FIG. 6 depicts in graphical representation the force versus displacement curve of the embodiments depicted in FIGS. 3–5 with a desired characteristic curve superimposed thereon.

In the disposition of spring suspension system 20 of FIGS. 1–3, and as best shown in FIG. 3 leaf springs 26 of device 24 have an effective arm length $l_1$ while leaf springs 26 of device 24 each have an effective arm length $l_2$. Although arm lengths $l_1$ and $l_2$ are shown as being equal, they may be made different by employing different radii of respective shims 38, 40, 46, and 48. Upon slight movement of spring suspension system 20 under a force acting in a direction along the axis of rod 36, which movement is aided by a slight inward deflection of portions 32, for example in a downward direction with respect to the drawings, a particular force-displacement characteristic is obtained, as illustrated by straight line curve segment 54 of FIG. 6. This characteristic is dependent upon the material, thicknesses, widths, and lengths of leaves 26 and vertical portions 32, as well as the angle between portions 32 and leaves 26, and these parameters may be changed and adjusted during manufacture to obtain the desired characteristic. Upon further exertion of force on system 20 in the downward direction, leaf springs 26 of leaf spring device 24 come in contact with the edge of clamp washer 50, as depicted in FIG. 4. This movement effectively shortens the arm length of these springs to a distance $l_3$ so that the entire suspension system is provided with a force-displacement characteristic as depicted by straight line curve segment 56 of FIG. 6, this latter characteristic having a slope which is different from and greater than that of segment 54. Upon still further displacement of the suspension system as shown in FIG. 5, leaf springs 26 of device 22 touch the edge of washer 42 to effectively shorten the arm length to a distance $l_4$. This shortening produces still another straight line curve segment 58 as shown in FIG. 6 having a slope different from and steeper than both segments 54 and 56. Under all displacements, portions 32 deflect inwardly, as noted above, and will contribute a slight dimensional addition to the original arm length; however, this addition is small and can be taken into consideration in constructing the suspension system.

Any desired slope and point of change may be effected by fabricating clamp washers 42 and 50 with different radii and/or by fabricating shims 38 and 46 with different thicknesses in order to provide any desired non-linear curve segments such as curve segments 54, 56, and 58. The desired radii of the washers and thicknesses of the shims are so selected as to match, as closely as possible, to a desired non-linear curve 59 superimposed on segments 54, 56, and 58 of FIG. 6.

Figure 7:
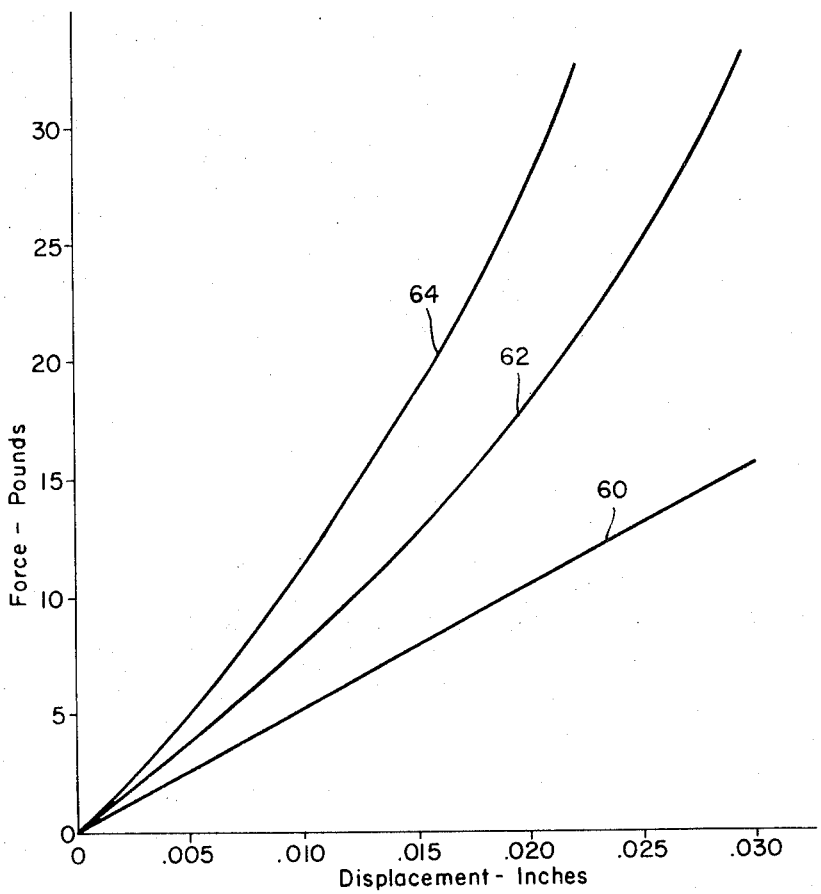
FIG. 7 is a graph taken from an actual measurement of three separate variations utilizing different elements of the embodiment of FIG. 1.

Furthermore, any combination of washers and shims with appropriate radii and thicknesses can be used to obtain any composite curve as indicated by basic, nominal, and high rate build curves 60, 62, and 64, respectively shown in FIG. 7.

Figure 8:
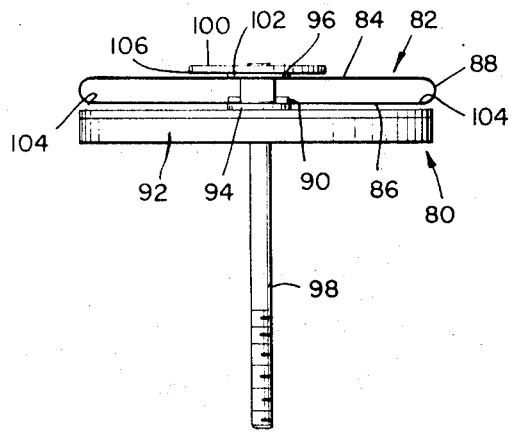
FIG. 8 is a view in elevation of a second embodiment of the present invention.
Figure 9:
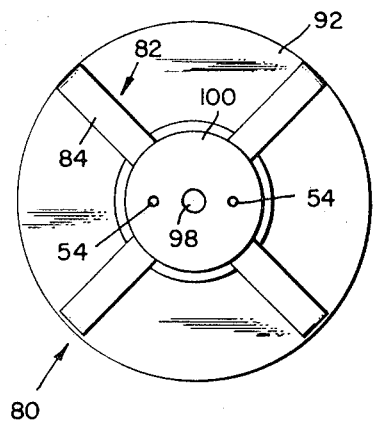
FIG. 9 is a top view of the embodiment depicted in FIG. 8.

Referring now to FIGS. 8 and 9, a second embodiment of the present invention comprises a spring suspension system 80. This embodiment comprises a leaf spring device 82 comprising a pair of leaf springs 84 and 86 joined by an elbow portion 88. Leaf spring 86 is fixed at its end 90 to a support 92 and is spaced therefrom by a shim 94. Leaf spring 84 is freely moveable at its free end 96 which is clamped to a rod 98 by a washer 100 which is spaced from leaf spring 84 by a shim 102.

Operation of the embodiment of FIGS. 8 and 9 is similar to that described with FIGS. 1–5; however, with displacement of the rod in a downward direction, elbows 88 first make contact with support 92 at their points 104, and upon further displacement, leaf spring 84 makes contact with the edge 106 of washer 100 in order to provide a force-displacement curve or characteristic similar to that depicted in FIG. 6.

Figure 11:
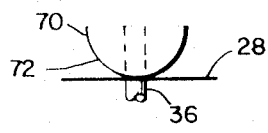
FIG. 11 is still another view of an element for obtaining a smooth change in linearity of the force-displacement characteristics of the embodiments of FIGS. 1 and 8.
Figure 10:
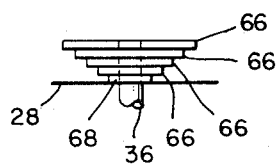
FIG. 10 is a view illustrating the use of several means to obtain variation in the force-displacement characteristics of the embodiments of FIGS. 1 and 8.

In addition, as shown in FIG. 10, a plurality of clamp washers 66 set upon a shim 68 may be provided with increasing radii in order to vary and adjust the slope of the curve. Alternately, a single clamp washer 70 with a curved three-dimensional surface 72 may be provided to obtain the smoothest possible force-displacement characteristic, as in shown in FIG. 11.

Figure 12:
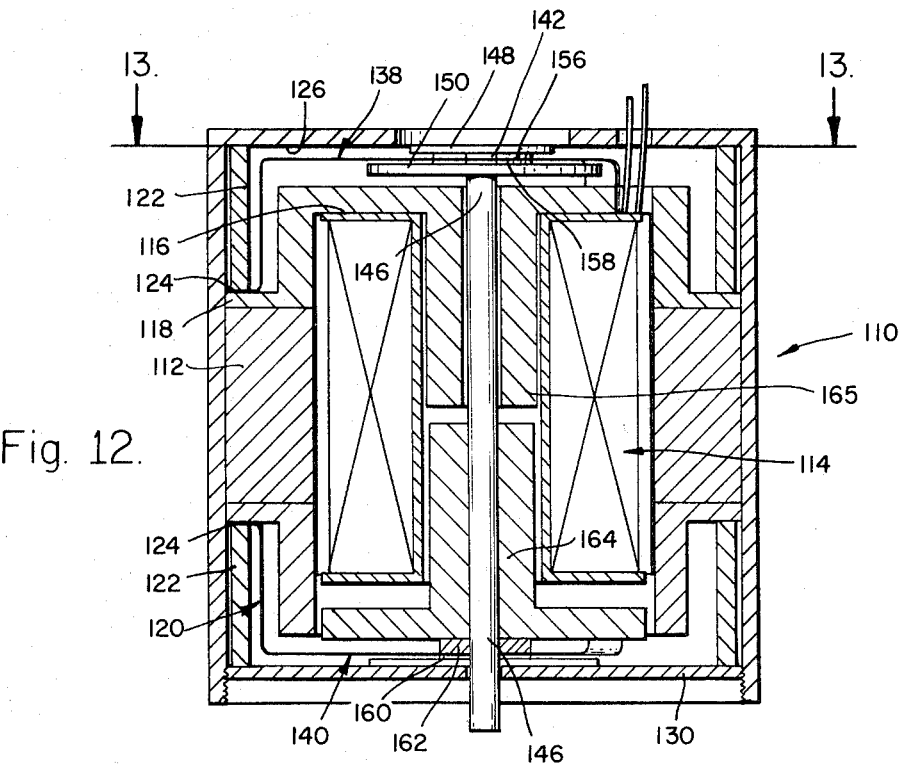
FIG. 12 is a view in cross section of a linear motion electromechanical device using the non-linear spring suspension embodiment shown in FIG. 1 and taken along lines 12—12 of FIG. 13.
Figure 13:
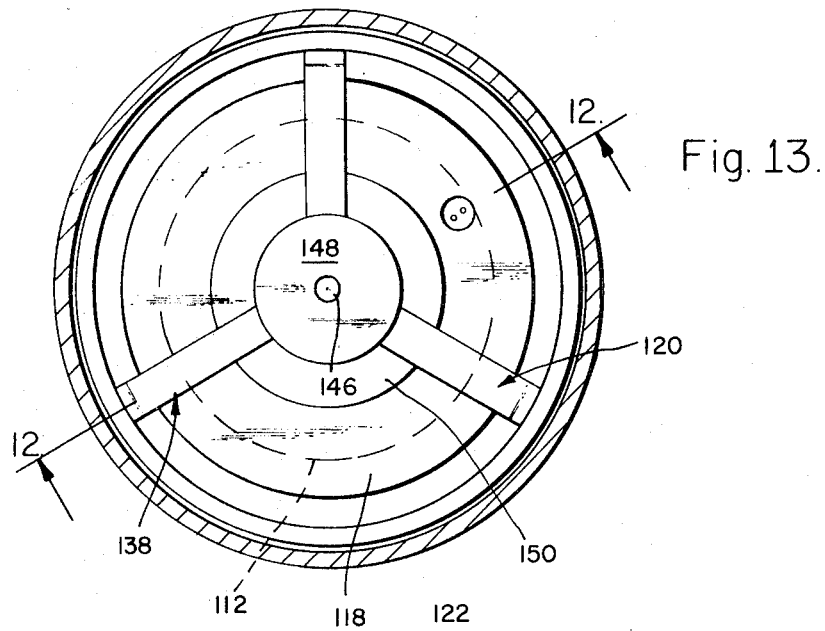
FIG. 13 is a cross-sectional view of the device of FIG. 12 taken along lines 13—13 thereof.

Such a suspension system described above may be utilized in an electromechanical device to produce linear motion. Such an electromechanical device is depicted in FIGS. 12 and 13 and is generally indicated by reference numeral 110. This device comprises a permanent magnet 112 of annular shape which may be formed from several pieces. Centrally located within permanent magnet 112 is an electromagnet 114, also of annular shape. The coil of the electromagnet is housed within a support 116 and is secured to the permanent magnet by means of a rigid housing 118 of magnetic material. Placed about housing 118 is a spring suspension system 120 of similar design as that shown in FIGS. 1–5. Spacer rings 122 are provided between foot portions 124 of system 120 and an inner surface 126 of an open ended cover 128. A plate 130 is threadedly engaged with cover 128 to enclose the suspension system feet at the other end of device 110. Suspension system 120 comprises a pair of leaf spring devices 138 and 140 having moveable hub portions 142 and 144 joined to a rod 146 by clamp washers 148, 150, and 152 and by an armature 154 with shims 156, 158, 160 and 162 respectively therebetween. Armature 154 also functions similarly as a clamp washer.

In this embodiment, since movement is only to be in an upward direction, with respect to the drawing, armature 154 comprises an end piece of magnetic material having an extension 164 secured to rod 146 and spaced from leaf spring device 140 by one of the shims.

Figure 14:
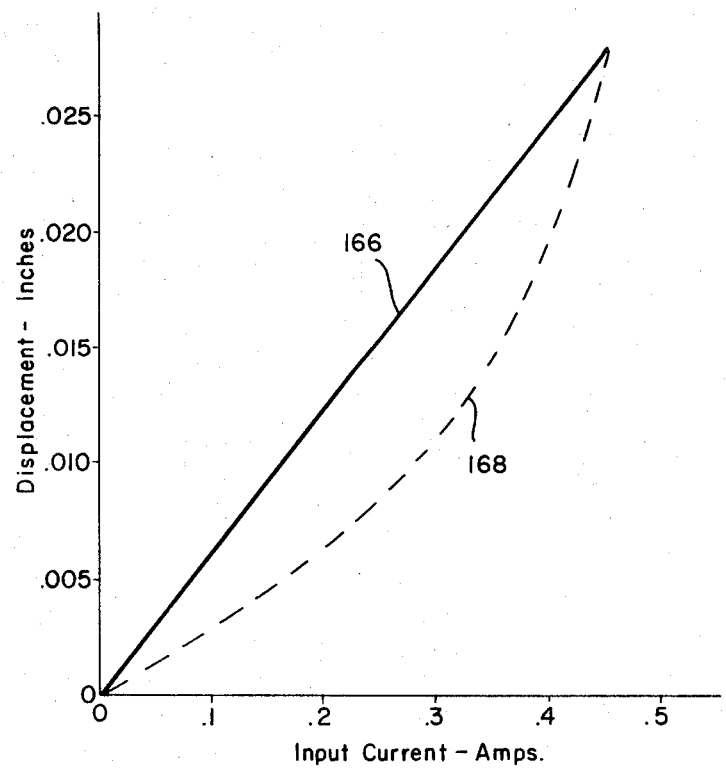
FIG. 14 is a graph of displacement versus input current of the device depicted in FIGS. 12 and 13 with a similar curve shown in dashed lines of a similar device using a linear spring.

Operation of device 110 is similar to that described with respect to copending pat. application, Ser. No. 885,098, (U.S. Pat. No. 3,604,959) noted above. Armature 154 is attracted by pole piece 165 of permanent magnet 112 in an upward direction against the counterforce of spring suspension system 120. This attraction between pole 165 and armature extension 164 provides a non-linear magnetic force — armature position characteristic to device 110. This characteristic is opposed by the opposite non-linear characteristic of spring suspension system 120 so as to provide, in combination, linear motion as depicted by curve 166 of FIG. 14. For purposes of comparison, dashed curve 168 shows the composite curve obtained when a linear spring is employed in the device. In the use of device 110, the electromagnetic force can oppose the force of the permanent magnet so as to position the armature as desired or to operate the device in a manner as to position the armature at either extreme of its stroke or to obtain an amplifier effect, all as more fully described in copending application, Ser. No. 885,098 (U.S. Pat. No. 3,604,959).

Figure 15:
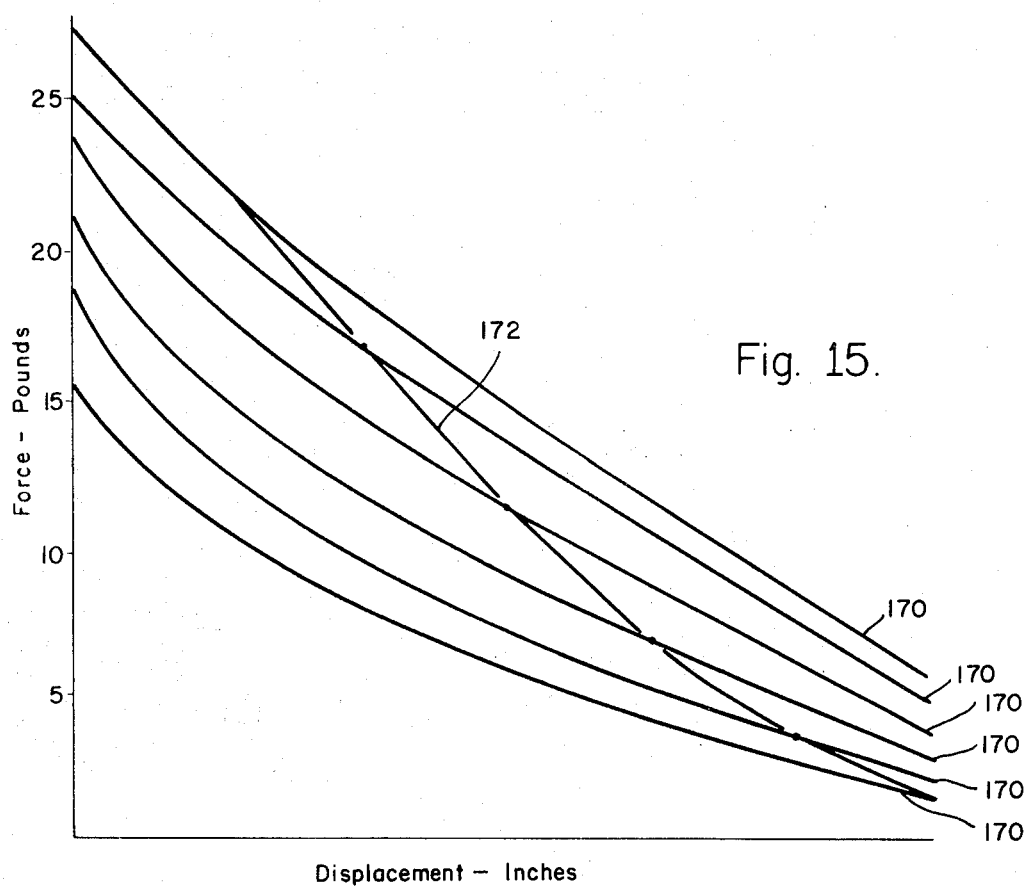
FIG. 15 is a graph of force versus displacement for a permanent magnet force field and electro-magnet force field with a required spring characteristic for achieving displacement proportional to ampere turns.

A typical application of a non-linear force field is described with reference to FIG. 15. Curves 170 represent force-displacement curves for a magnetic circuit with various field strengths resulting from a combination of a permanent magnetic field influenced by various levels of magnetic flux from an electromagnetic field. Curve 172 represents the mirror image of the non-linear spring suspension system. For each flux level of the electromagnetic field, as represented by the several curves 170, a new force-displacement characteristic is established. Since it is desirable to convert this control of force into a device having a rectilinear output movement which is proportional to the input current to the electromagnet, to cause a change in the electromagnetic field strength, a non-linear spring having the characteristics of curve 172, will provide a rectilinear output whose displacement is proportional to the coil input current.

The present invention is also applicable to use in a solenoid which may take the configuration of the electromechanical device depicted in FIGS. 12 and 13 but without use of a permanent magnet in order to match the electromagnet force versus armature position characteristic in any desired manner.

Although the invention has been described with reference to particular embodiments thereof, it should be realized that various changes and modifications may be made therein without departing from the spirit and scope of the invention.

What is claimed is:

1. A frictionless non-linear spring device comprising:
    a rod having an axis and moveable along the axis;
    a support fixed with respect to said rod;
    a unitary body of spring material including a hub centrally positioned on said rod, a plurality of leaves terminating at first ends thereof at said hub and radiating outwardly therefrom to second terminal ends, and a plurality of terminal members each secured substantially at right angles to each of said leaves at the second ends thereof and extending substantially parallel to the axis, each of said terminal members having a foot portion affixed to said support;
    at least one annular spacer shim of specified radius and axial thickness positioned on said rod and on one side of said hub; and
    at least first and second annular washers, at least said first washer having a specified radius greater than the radius of said spacer shim, said first washer being threadedly engaged with said rod and positioned in contact with said shim, said first and second washers having a clamped engagement about said shim and said hub;

whereby said leaves have a first arm length determined by the lever arm between the radius of said shim and the second terminal ends of said leaves and a second arm length determined by the lever arm between the radius of said first washer and the second terminal ends of said leaves and whereby the lever arm of said leaves is shortened from the first arm length to the second arm length upon axial movement of said rod in a direction to effect contact between said leaves and the edges of said first washer in accordance with the thickness of said shim, and whereby said rod is constrained to move with rectilinear motion.

2. A non-linear spring device comprising at least one spring means having a fixed portion and a moveable portion to define a lever arm and means contactable with said spring means between said fixed and moveable portions to shorten the lever arm.

3. A non-linear spring device as in claim 2 wherein said spring means comprises a solid diaphragm.

4. A non-linear spring device comprising leaf spring means having at least two fixed portions and a moveable portion intermediate said fixed portions to provide a lever arm of determinate length, and lever arm shortening means contactable with said spring means intermediate said fixed portions to shorten the length of the lever arm.

5. A non-linear spring device as in claim 4 further including elbow portion means at said fixed portion to enhance movement of said moveable portion.

6. A non-linear spring device as in claim 4 wherein said shortening means includes at least one rigid member secured to said spring means intermediate said fixed portions for contact at, at least, two spaced points on said spring means during movement of said moveable portion.

7. A non-linear spring device as in claim 6 wherein said rigid member has a radius to provide the spaced point contact and wherein said rigid member may be replaced with a rigid member having a radius different from said first-mentioned rigid member to change the point contact.

8. A non-linear spring device as in claim 6 wherein said rigid member is spaced from said spring means to provide a spacing and the spaced point contact and wherein the spacing is adjustable to change the point contact.

9. A non-linear spring device as in claim 4 wherein said shortening means includes a rigid member having a first part affixed to said spring means intermediate said fixed portions and having at least a second part spaced from said first part and spaced from said spring means, said second part contactable with said spring means upon movement of said moveable portion to shorten the length of the lever arm.

10. A non-linear spring device as in claim 9 further including spacer means secured to said spring means moveable portion between said rigid member and said spring means at said first part to provide the spacing between said second part and said spring means.

11. A non-linear spring device as in claim 4 wherein said shortening means includes a rigid member secured to said spring means moveable portion and a shim positioned between said moveable portion and said rigid member, said rigid member having one part overlapping said shim to provide a space between said one part and said moveable portion to define a first length of the lever arm at one position of said moveable portion when said one part is spaced from said moveable portion and to define a second length of the lever arm shorter than the first length at a second position of said moveable portion when said moveable portion moves into contact with said one part of said rigid member.

12. A non-linear spring device as in claim 11 wherein said rigid member comprises an annular washer and said spring means comprises a plurality of leaf springs joined at one end thereof.

13. A non-linear spring device comprising: spring leaf means having a fixed portion, a moveable portion, and an elbow portion joining said fixed and moveable portions; and rigid member means coupled to said spring leaf means and having at least one contact portion spaced from said spring leaf means and positioned in the path of movement of said spring leaf means for contact therewith at, at least, one point intermediate said fixed and moveable portions whereby the arm length of said spring leaf means between said fixed and moveable portions is shortened upon the contact between said one contact portion of said rigid member means and said one point of said spring leaf means.

14. A non-linear spring device as in claim 13 wherein said rigid member means is secured to said spring leaf means.

15. A non-linear spring device as in claim 13 further including a shim positioned between said rigid member means and said spring leaf means to provide the spacing therebetween.

16. A linear motion device comprising an armature of magnetic material moveable to a plurality of positions along a linear path; a permanent magnet having a strong magnetic force acting on said armature to cause attraction thereof in a direction towards said permanent magnet; the attraction of the magnetic force on said armature decreasing as the distance of said armature increases from said permanent magnet to establish a magnetic force versus armature position characteristic; a non-linear spring coupled to said armature and exerting a force thereon to bias said armature in a direction away from said permanent magnet, the force of said spring on said armature decreasing as the distance of said armature increases from said permanent magnet to establish a spring force versus armature position characteristic; said spring comprising spring leaf means having ends secured to said permanent magnet and a central portion secured to said armature and moveable therewith to provide a maximum lever arm length of said spring leaf means, rigid member means spaced from said spring leaf means and positioned in the path of movement of said central portion to permit at least one point of contact with said spring leaf means intermediate said central portion and said ends in order to shorten the maximum lever arm length in accordance with the spring force versus armature position characteristic; said rigid member being so positioned with respect to said spring leaf means that the spring force versus armature position characteristic is proportionally opposite to the magnetic force-armature position characteristic; and an electromagnet coupled to said permanent magnet and connected to a source of electrical power and having an electromagnetic force for acting in conjunction with said permanent magnetic force.

17. An electromechanical device comprising an armature of magnetic material moveable to a plurality of positions along a linear path; an electromagnet energizable to produce a magnetic force acting on said armature to cause attraction thereof in a direction towards said electromagnet, the attraction of the magnetic force on said armature decreasing as the distance of said armature increases from said electromagnet to establish a magnetic force versus armature position characteristic; a non-linear spring coupled to said armature and exerting a force thereon to bias said armature in a direction away from said permanent magnet, the force of said spring on said armature decreasing as the distance of said armature increases from said electromagnet to establish a spring force versus armature position characteristic; said spring comprising leaf spring means having ends secured to said electromagnet and a central portion secured to said armature and moveable therewith to provide a lever arm length of said leaf spring means, and rigid member means spaced from said leaf spring means and positioned in the path of movement of said central portion to permit at least one point of contact with said leaf spring means intermediate said central portion and said ends in order to shorten the lever arm length.

18. A spring suspension system having adjustable non-linear characteristics comprising:
   first leaf spring means including a plurality of first leaves of spring material, said first leaves joined at one end of each of said first leaves to form a first hub and extending outwardly to first terminal portions;
   second leaf spring means including a plurality of second leaves of spring material, said second leaves joined at one end of each of said second leaves to form a second hub and extending outwardly to second terminal portions, said second terminal portions secured to said first terminal portions;
   a rod extending between said first and second hubs;
   a first pair of shims secured to and about said first hub and centered on said rod;
   a first pair of washers secured to and about said first pair of shims and centered on said rod, said first pair of washers having radii greater than the radii of their contacting shims;
   a second pair of shims secured to and about said second hub and centered on said rod; and
   a second pair of washers secured to and about said second pair of shims and centered on said rod, said second pair of washers having radii greater than the radii of their contacting shims;
   whereby movement of said rod effects a plurality of contacts between said washers and said leaves in accordance with the thicknesses of said contacting shims and the radii of said washers.

19. A system as in claim 18 further including elbow portions at the terminal portions of said first and second leaves to enhance deflection of said leaf spring means.

20. A spring comprising a central portion having a periphery and support means angularly secured to said central portion at the periphery thereof, the material, thicknesses, widths, and lengths of said central portion and said support means and the angularity therebetween being selected to impart particular spring characteristics to said spring.

21. A non-linear spring device comprising:
   spring leaf means having at least a pair of leaves of spring material placed parallel to each other and an elbow portion joining said leaves of spring material; and
   rigid member means coupled to said spring leaf means and having at least one contact portion, said rigid member contact portion overlaying said pair of leaves, and spaced from said spring leaf means and positioned in the path of movement of said spring leaf means for contact therewith at, at least, one point intermediate said leaves of spring material whereby the arm length of said spring leaf leans is shortened upon the contact between said one contact portion of said rigid member means and said one point of said spring leaf means.

* * * * *